United States Patent [19]

Ikerd

[11] Patent Number: 5,234,241

[45] Date of Patent: Aug. 10, 1993

[54] WEED REMOVER

[76] Inventor: Debra A. Ikerd, 17237 182nd Ave., Big Lake, Minn. 55309

[21] Appl. No.: 826,110

[22] Filed: Jan. 27, 1992

[51] Int. Cl.$^5$ ................................................ A01B 1/16
[52] U.S. Cl. ...................................... 294/50.8; 294/115
[58] Field of Search ................... 294/50.6, 50.7, 50.8, 294/50.9, 1.4, 60, 115, 116

[56] References Cited

U.S. PATENT DOCUMENTS

| | | | |
|---|---|---|---|
| 654,904 | 7/1900 | Marchant | 294/50.8 X |
| 1,225,188 | 5/1917 | Smith | 294/50.7 X |
| 1,328,063 | 1/1920 | St. John | 294/50.7 X |
| 1,443,138 | 1/1923 | Littley | 294/50.8 |
| 1,455,144 | 5/1923 | Moors | 294/50.8 X |
| 1,466,168 | 8/1923 | Holton | 294/50.7 X |
| 1,501,965 | 7/1924 | Moors | 294/50.8 X |
| 1,553,270 | 9/1925 | Saffold | 294/50.8 |
| 2,049,298 | 7/1936 | Jung | 294/50.8 X |
| 3,602,542 | 8/1971 | Disston | 294/50.7 |
| 4,473,248 | 9/1984 | Preradovich | 294/50.8 |

*Primary Examiner*—David M. Mitchell
*Assistant Examiner*—Dean Kramer
*Attorney, Agent, or Firm*—S. Michael Bender

[57] ABSTRACT

A manually operable weed remover consists of a cluster of pivotable spikes attached to a handle. When positioned over the center of a weed and downward pressure is applied, either by pushing on a bar handle or stepping on a foot rest, a bottom flange is forced up by the ground surface as the spikes are forced into the ground around the weed. The spikes are directed through apertures in the moveable flange and movement of the flange causes the spikes to close around the root of the weed. The weed may then be pulled from the ground by upward pressure on the tool.

6 Claims, 5 Drawing Sheets

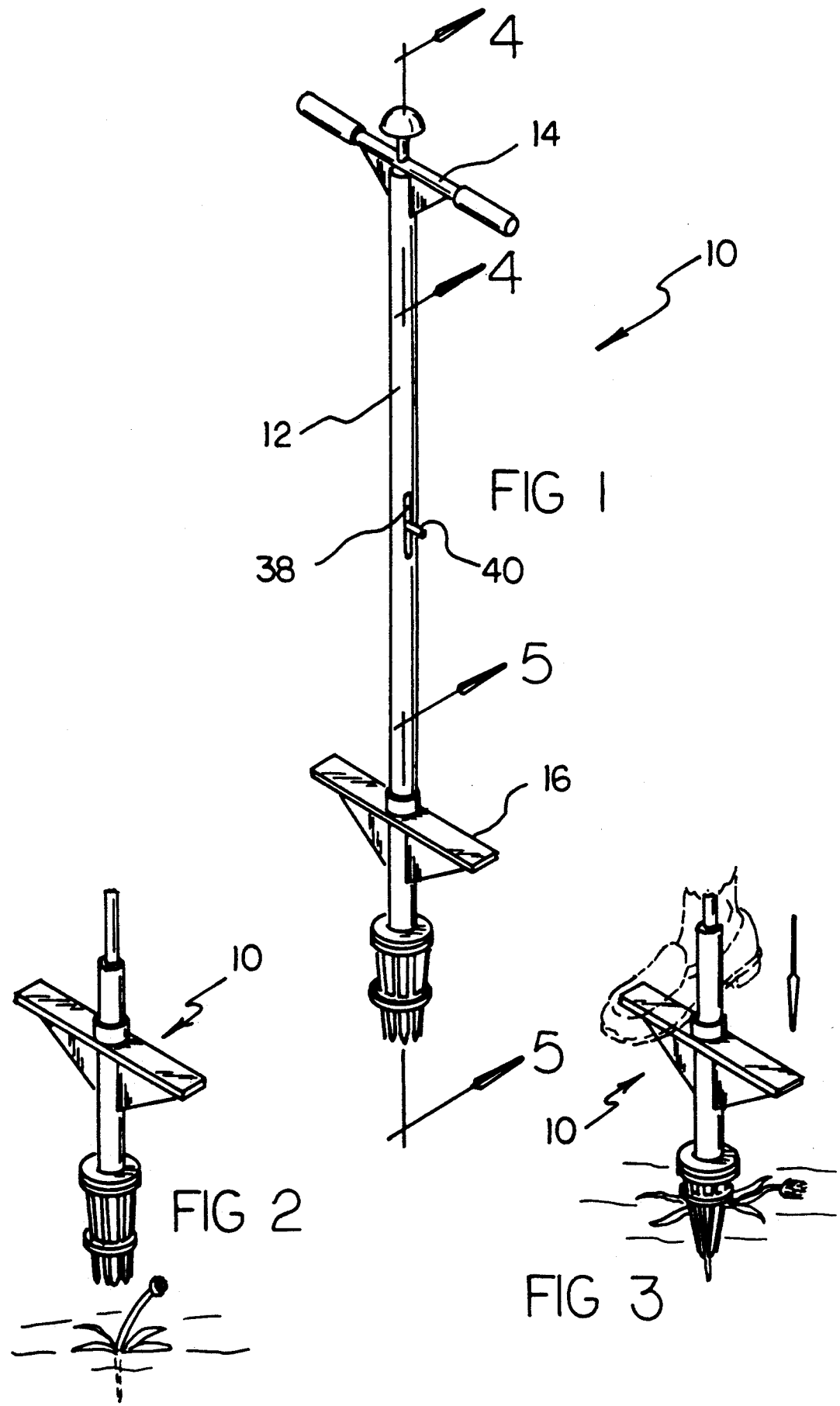

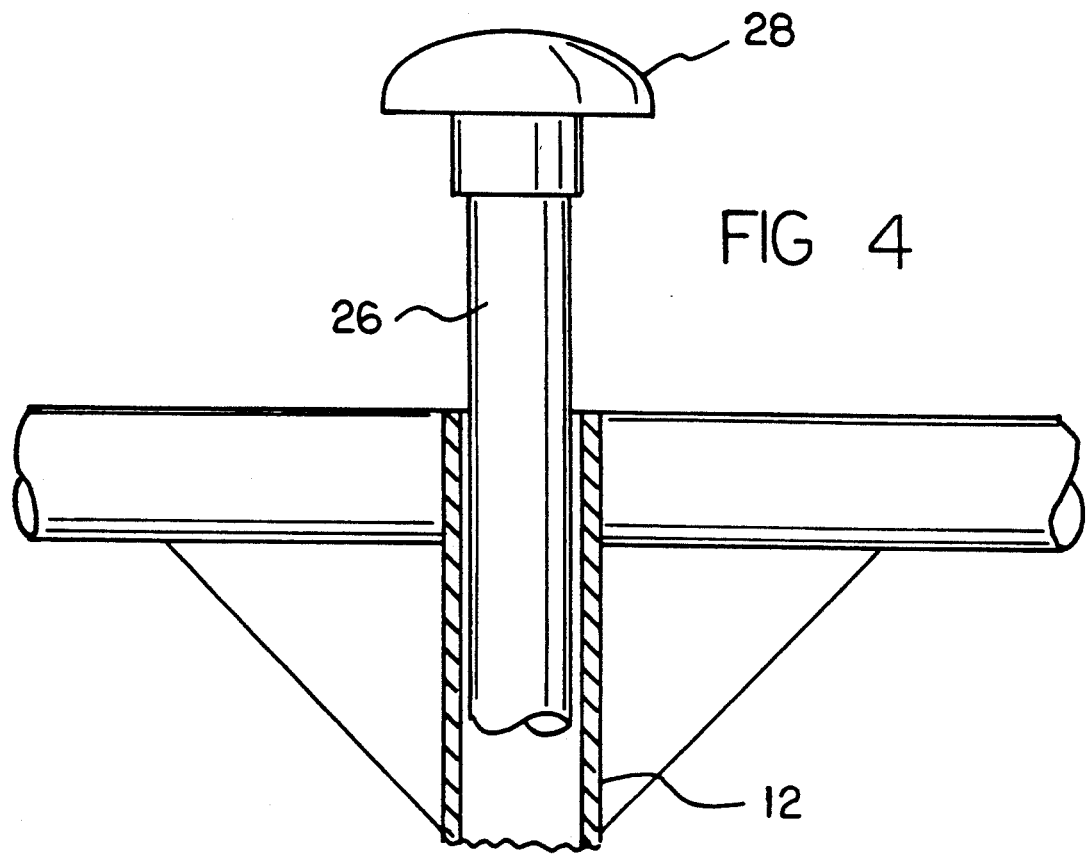
FIG 4
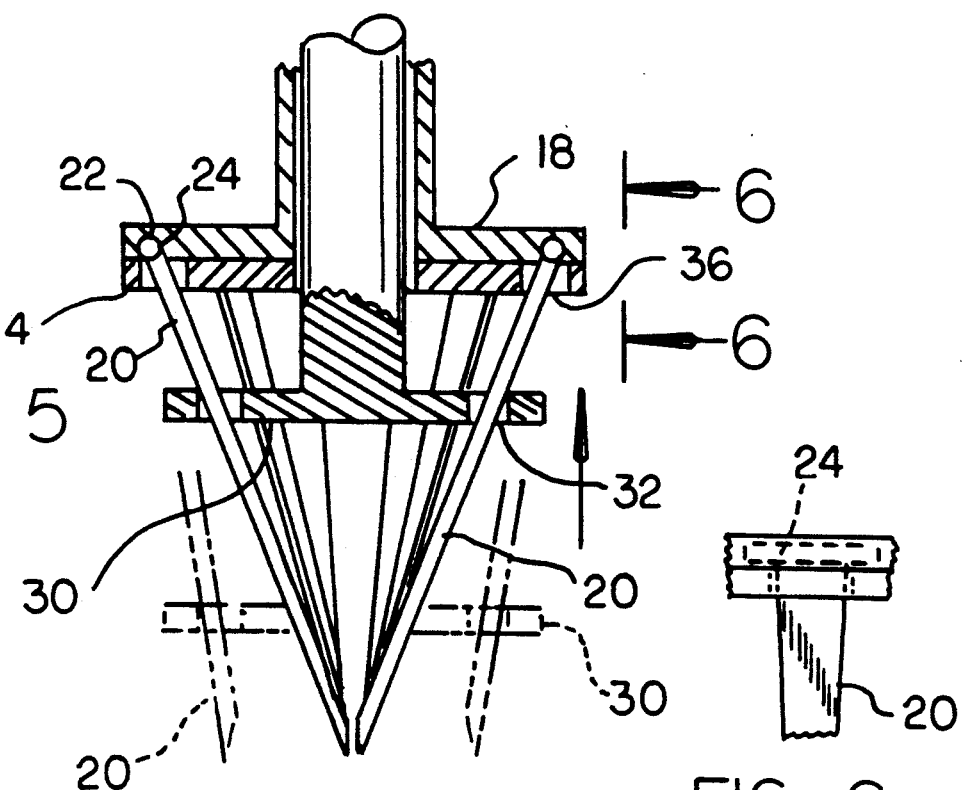
FIG 5
FIG 6

WEED REMOVER

BACKGROUND OF THE INVENTION

1. Field of the Invention

The present invention relates to garden tools and more particularly pertains to a manually operable weed remover which utilizes pivotal spikes to capture a weed and its attendant root structure.

2. Description of the Prior Art

There many types of garden tools which can be utilized to remove stubborn weeds from the lawn and garden. Most of these tools rely upon sharpened blades of one type of another whereof such blades are fixedly secured to a handle, and usaully substantial manual effort is required to remove weeds. Further, these types of prior art garden tools are not particularly suited for removing weed root structures. As such, there is a continuing need for new and improved manually operable garden tools which require less physical effort to remove weeds and which at the same time are more efficient at removing weed root structures. In this respect, the present invention substantially fulfills this need.

SUMMARY OF THE INVENTION

In view of the foregoing disadvantages inherent in the known types of weed removing garden tools now present in the prior art, the present invention provides an improved weed removing garden tool construction wherein the same can be used to remove substantially all of the root structure associated with a weed while a user of the tool applies only minimal physical effort. As such, the general purpose of the present invention, which will be described subsequently in greater detail, is to provide a new and improved weed removing garden tool which has all the advantages of the prior art weed removing garden tools and none of the disadvantages.

To attain this, the present invention essentially comprises a manually operable weed remover which consists of a cluster of pivotable spikes attached to a handle. When positioned over the center of a weed and downward pressure is applied, either by pushing on a bar handle or stepping on a foot rest, a bottom flange is forced up by the ground surface as the spikes are forced into the ground around the weed. The spikes are directed through apertures in the moveable flange and movement of the flange causes the spikes to close around the root of the weed. The weed may then be pulled from the ground by upward pressure on the tool.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved weed removing garden tool which has all the advantages of the prior art weed removing garden tools and none of the disadvantages.

It is another object of the present invention to provide a new and improved weed removing garden tool which may be easily and efficiently manufactured and marketed.

It is a further object of the present invention to provide a new and improved weed removing garden tool which is of a durable and reliable construction.

An even further object of the present invention is to provide a new and improved weed removing garden tool which is susceptible of a low cost of manufacture with regard to both materials and labor, and which accordingly is then susceptible of low prices of sale to the consuming public, thereby making such weed removing garden tools economically available to the buying public.

Still yet another object of the present invention is to provide a new and improved weed removing garden tool which provides in the apparatuses and methods of the prior art some of the advantages thereof, while simultaneously overcoming some of the disadvantages normally associated therewith.

Still another object of the present invention is to provide a new and improved weed removing garden tool which requires only minimal physical effort and which is substantially efficient at removing weed root structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the weed removing garden tool comprising the present invention.

FIG. 2 is a partial perspective view illustrating the manner of utilizing the present invention.

FIG. 3 is a partial perspective view further illustrating a manner of use of the present invention.

FIG. 4 is a cross-sectional view as viewed along the line 4—4 in FIG. 1.

FIG. 5 is a cross-sectional view as viewed along the line 5—5 in FIG. 1.

FIG. 6 is a cross-sectional view as viewed along the line 6—6 of FIG. 5.

DESCRIPTION OF THE PREFERRED EMBODIMENT

Figure 7:
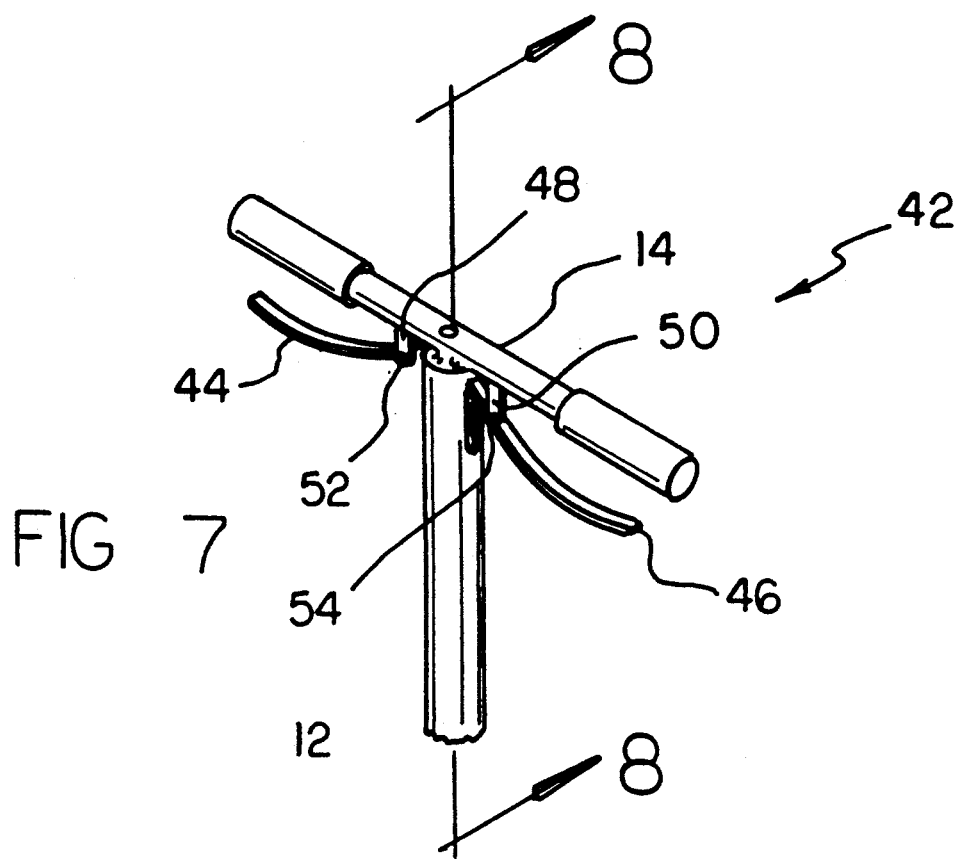
FIG. 7 is a partial perspective view of a modified handle structure associated with the present invention.

With reference now to the drawings, and in particular to FIGS. 1 to 12 thereof, a new and improved weed removing garden tool embodying the principles and concepts of the present invention and generally designated by the reference numeral 10 will be described.

More specifically, it will be noted that the weed removing garden tool 10 includes a long hollow tubular shaft 12 having a topmost mounted T-shaped handle structure 14 and a bottommost mounted T-shaped foot rest structure 16. viewing FIGS. 4, 5, and 6 in conjunction with FIG. 1, it will be further noted that the bottom of the tubular member 12 includes an integral or otherwise fixedly secured outwardly extending circular flange 18. A plurality of downwardly extending spikes, all of which are generally designated by the reference numeral 20, are pivotally attached to the flange 18 by some conventional means. In the present case, the spikes 20 are attached to the flange 18 by being inserted in apertures 22 formed in the flange 18, and cross-extending pins 24 operate as pivot shafts to which the spikes 20 are pivotally mounted. However, any type of conventional pivotal mounting is within the scope and purview of the present invention.

With continuing reference to FIGS. 1, 4, 5 and 6, it will be seen that the hollow shaft 12 further includes a axially aligned, centrally disposed rod member 26 extending therethrough. A wooden handle 28 shaped to conform to the palm of a user's hand is positioned on a topmost portion of the rod 26, and a bottom end of the rod includes an integrally or otherwise fixedly secured, outwardly extending flange 30 which is of a circular construction and which includes a plurality of radially disposed through-extending apertures, all of which are designated by the reference numeral 32. A further circular flange 34, hereinafter referred to as a pivot flange, is fixedly secured to a bottom portion of the flange 18. The pivot flange 34 includes a plurality of through-extending apertures, all of which are generally designated by the reference numeral 36, and each of these apertures are aligned with respect to pivotal spikes as best illustrated in FIG. 5. By the same token, the plurality of apertures 32 formed in the spike release flange 30 are also radially disposed in a manner to be alignable with the plurality of weed removing spikes 20.

As best illustrated in FIG. 1, the shaft 12 is provided with a longitudinally aligned through-extending slot 38, and a pin 40 extends through the slot and is fixedly secured to the internal spike release shaft 26. The pin 40 operates to prevent the rotation of the spike release shaft 26 within the tubular shaft 12, thus to prevent a binding effect from occurring between the spikes 20 and the aliqned apertures 32 formed in the guide flange 30.

The manner of operation of this first embodiment 10 of the invention will now be described. More specifically, it can be seen that with the guide flange 30 in a downwardly disposed position as best illustrated in FIG. 1, wherein the shaft 26 is pushed downwardly to its fullest extent, the spikes 20 may be positioned over a weed as shown in FIG. 2. Downward pressure may then be applied to the spikes 20 as illustrated in FIG. 3, i.e., by means of applying a person's physical weight to the foot rest 16 or by pushing downwardly on the T-shaped handle structure 14, and the spikes will then go into the ground around the weed. As the spikes 20 move into the ground, the ground forces the guide flange 30 upwardly so as to cause the internal shaft 26 to move upwardly within the tubular shaft 12. This upward movement of the guide flange 30 causes the spikes 20 to be moved inwardly into a pointed structure as best illustrated in FIG. 5, with such movement of the spikes occurring because of their pivotal attachment within the spike retainer flange 18 and their positioning through the pivot flange 34. Once the guide flange 30 is abutted against or is substantially near the pivot flange 34, the spikes 20 will have firmly grasped the weed and its attendandt root structure and an upward pulling motion on the handle assembly 14 will result in the weed being removed from the ground.

Figure 8:
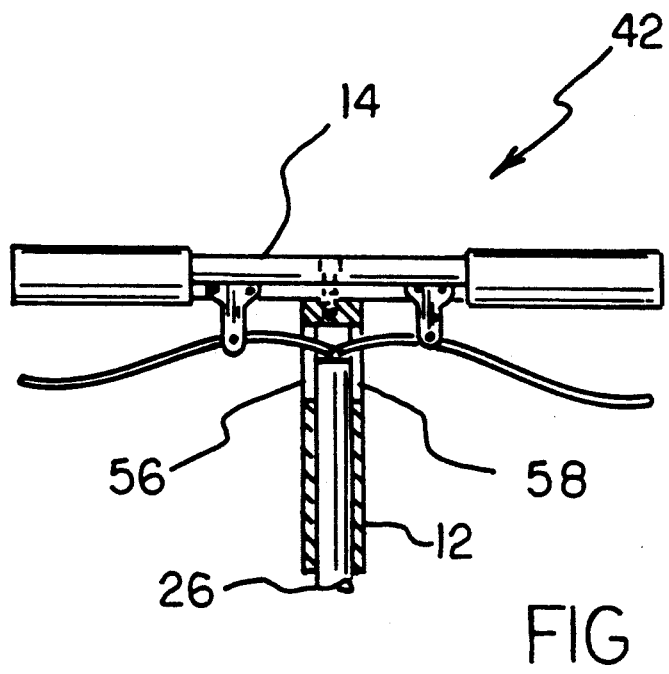
FIG. 8 is a cross-sectional view of the invention as viewed along the line 8—8 of FIG. 7.

FIGS. 7 and 8 illustrate modified embodiment of the invention which is generally designated by the reference numeral 42. In this embodiment, an alternative means is disclosed for causing the internal spike release shaft 26 to be moved downwardly so as to cause the guide flange 30 to force the spikes 20 into an open, weed receiving position. As shown, the palm receiving handle 28 has been removed in favor of a pair of pivotable levers 44, 46 which are respectively attached to the handle structure 14 by downwardly extending brackets 48, 50. The levers 44, 46 are attached to the brackets 48, 50 by respective pivot pins 52, 54 and both of these levers respectively extend through slots 56, 58 longitudinally disposed within a top portion of the shaft 12. As best shown in FIG. 8, a user of the embodiment 42 of the invention can utilize his hands to force the levers 44, 46 into a close abutting relationship with the T-shaped handle structure 14, thereby to provide a downward pushing force on the internal shaft 26 which then opens the spikes 20 in a well understood manner. This effectively provides an alternative means for releasing a weed from the spikes 20 after the weed has been removed from the ground.

Figure 9:
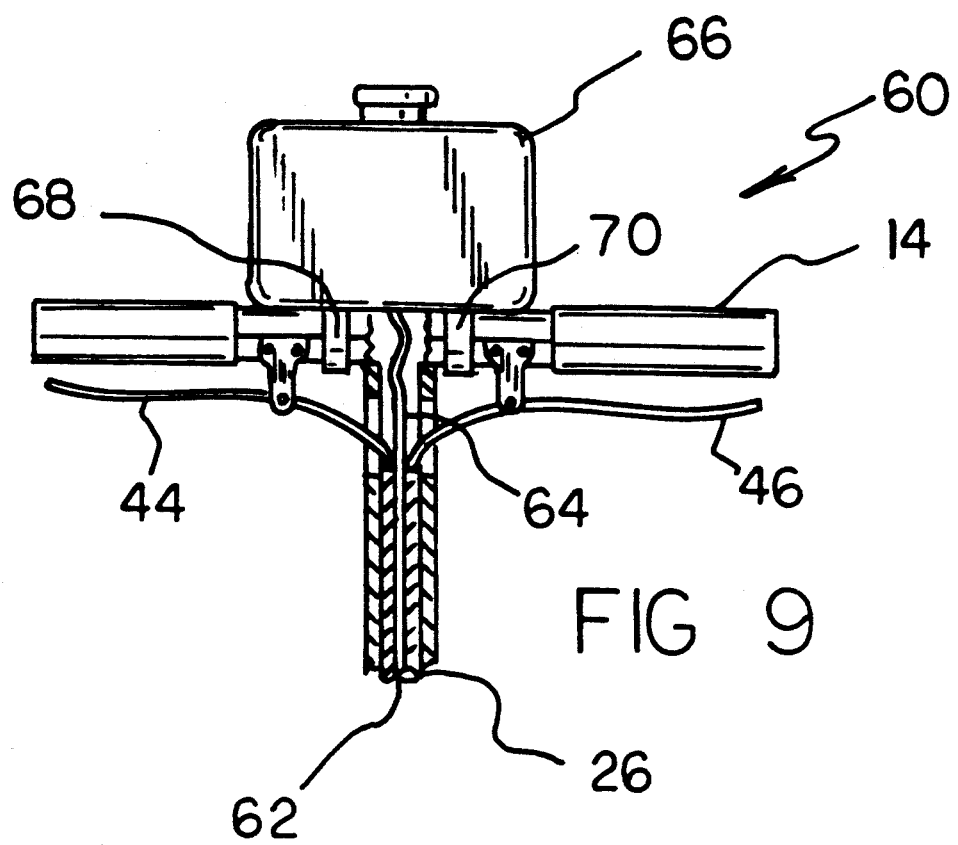
FIG. 9 is a cross-sectional view of a modified handle structure associated with the invention.
Figure 10:
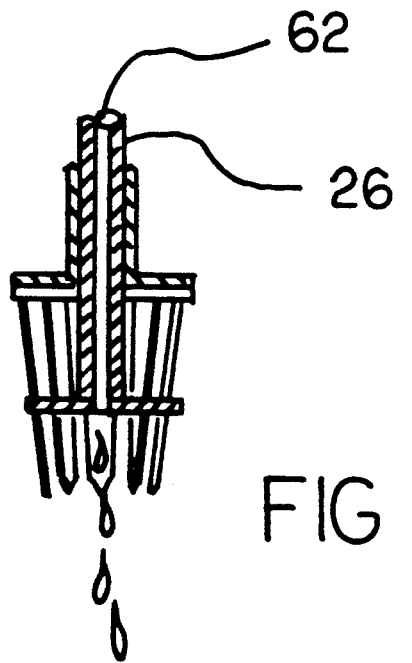
FIG. 10 is a cross-sectional view of a modified spike structure associated with the invention.
Figure 11:
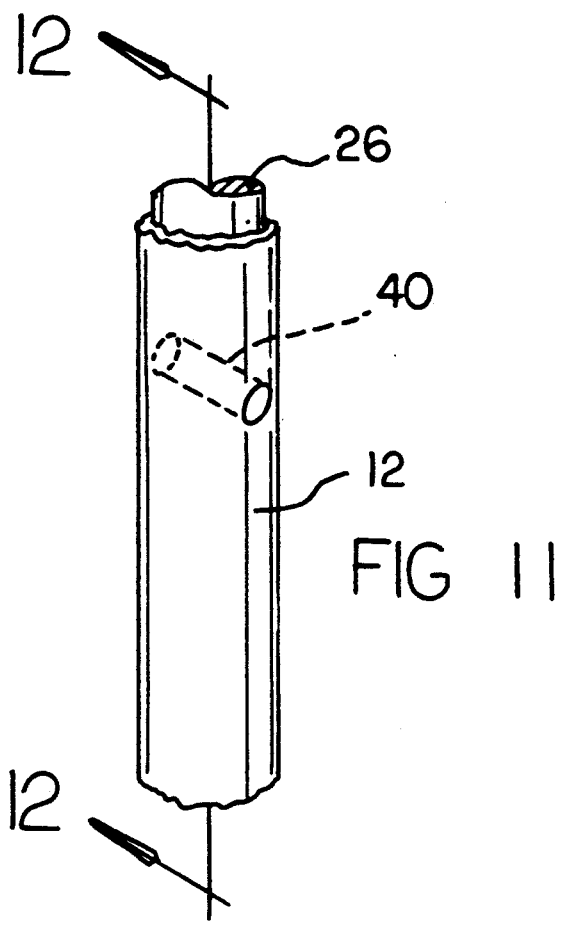
FIG. 11 is an isometric partial view of the inner and outer shaft structures 26 and 12 respectively, to include the inner shaft formed with an inner slot 26a receiving the pin 40 within the slot, with the pin 40 fixedly secured diametrically oriented relative to the outer shaft 12 to prevent rotation of the inner shaft relative to the outer shaft as a variation and further configuration of the mounting of the inner shaft relative to the outer shaft.
Figure 12:
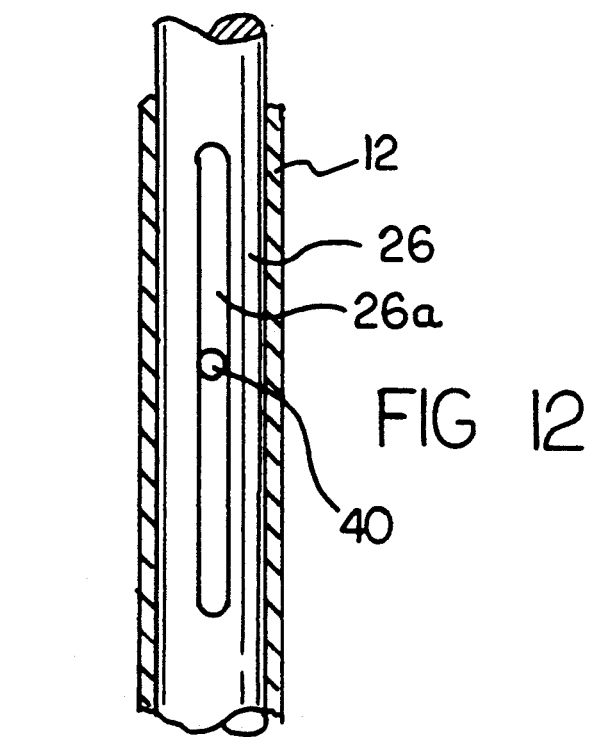
FIG. 12 is a cross-sectional elevational view taken along line 12—12 of FIG. 11.

FIGS. 9 and 10 illustrate a third embodiment of the invention which is generally designated by the reference numeral 60. This third embodiment utilizes the levers 44, 46 as described in FIGS. 7 and 8, and further includes a through-extending, axially aligned, centrally disposed bore 62 which communicates with a flexible tube in fluid communication with a container 66 fixedly secured to the handle structure 14 by clamps 68, 70. The container 66 is used to store a liquid or powder weed killer. The levers 44, 46 can be so disposed so as to pinch the flexible tube 64 in a closed position, and at such time they are moved upwardly towards the handle structure 14, the tube 64 will be opened to allow a dispensing of the weed killer contained within the container 66. The dispensing of a liquid weed killer is illustrated in FIG. 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved weed removing garden tool comprising:
   spike means for grasping a weed;
   first shaft means to which said spike means is pivotally attached;
   handle means for facilitating a use of said garden tool, said handle means being attached to said first shaft means;
   second shaft means positioned internally of said first shaft means and being axially moveable relative thereto between first and second positions;
   guide flange means fixedly secured to a bottom portion of said second shaft means, said spike means being guided in pivotal movement by said guide flange means from said first position to said second position thereby to facilitate a grasping of said weed, and
   manually activatable means for selectively causing said second shaft means and said guide flange means fixedly secured thereto to axially move relative to said first shaft means from said second position to said first position to thereby cause said weed to be released from said spike means,
   wherein said handle means comprises cross-bar means affixed to the distal end of said first shaft means opposite said pivotally attached spike means, and said manually activatable means comprises a gripping member attached to a distal portion of said second shaft means extending through an opening intermedially of said cross-bar means, said gripping member adapted to cause selective axial sliding movement of said second shaft means relative to said first shaft means between said second position to said first position, and
   foot rest means attached to said first shaft means proximal to said pivotally attached spike means, said foot rest means comprising a rigid member laterally extending from said first shaft means and adapted to cause said spike means to penetrate soil in the vicinity of a weed and to simultaneously cause axial movement of said guide flange means from said first position to said second position upon the action of the foot of a gardener bearing down against said rigid member.

2. The new and improved weed removing garden tool as described in claim 1, wherein said spike means is pivotally attached to a spike retainer flange attached to a bottom portion of said first shaft means.

3. The new and improved weed removing garden tool as described in claim 2, and further wherein said spike means is directed through a plurality of apertures formed in a pivot flange abuttable with and fixedly secured to said spike retainer flange.

4. The new and improved weed removing garden tool as described in claim 3, and further including pin means fixedly secured to said second shaft means and extending through a slot formed in said first shaft means, said pin means being operable to prevent relative rotation between said first shaft means and said second shaft means, thereby to prevent said guide flange means from binding during movement relative to said spike means.

5. A new and improved weed removing garden tool comprising:
   spike means for grasping a weed;
   first shaft means to which said spike means is pivotally attached;
   handle means for facilitating a use of said garden tool, said handle means being attached to said first shaft means;
   second shaft means positioned internally of said first shaft means and being axially moveable relative thereto between first and second positions;
   guide flange means fixedly secured to a bottom portion of said second shaft means, said spike means being guided in pivotal movement by said guide flange means from said first position to said second position thereby to facilitate a grasping of said weed, and
   manually activatable means for selectively causing said second shaft means and said guide flange means fixedly secured thereto to axially move relative to said first shaft means from said second position to said first position to thereby cause said weed to be released from said spike means,
   wherein said first shaft means includes cross-bar means affixed to the distal end thereof opposite said pivotally attached spike means, and said manually activatble means comprises a gripping member pivotally attached to said cross-bar means and having an end engaging said second shaft means through an opening in said first shaft means proximal to said cross-bar means whereby pivotal movement of said gripping member is adapted to cause axial movement of said second shaft means relative to said first shaft means from said second position to said first position, further including reservoir means on said first shaft means, said second shaft means being tubular and having an axial opening therein, said reservoir means being connected to said axial opening of said second shaft means by a conduit, said gripping member end engaging said conduit so as to prevent the flow of any substance in said reservoir from entering said axial opening in the absence of pivotal movement of said gripping member relative to said cross-bar means.

6. The garden tool of claim 5 wherein said substanced in said reservoir is a weed-killing compound.

* * * * *